INVENTORS
PAUL F. HAYNER
LAWRENCE W. SHARPE

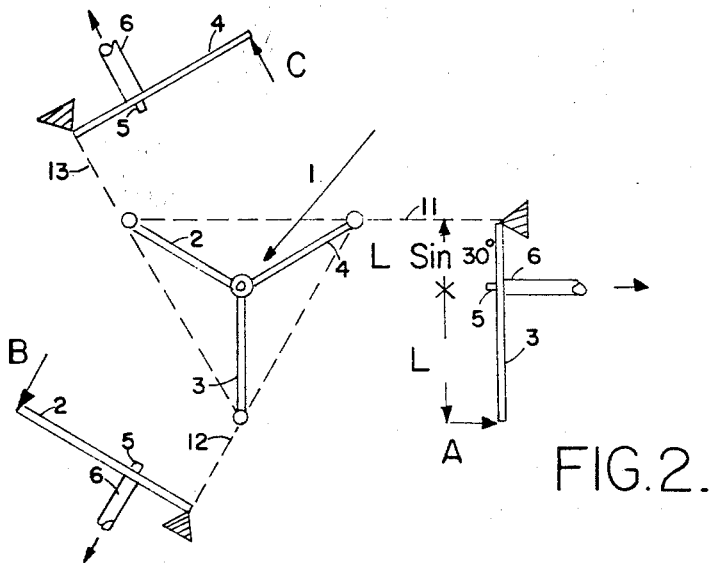
FIG.2.
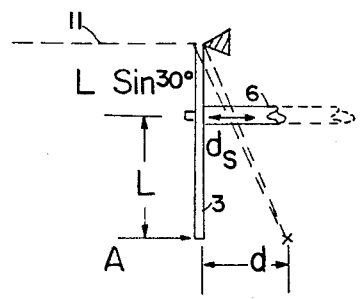
FIG.1a.
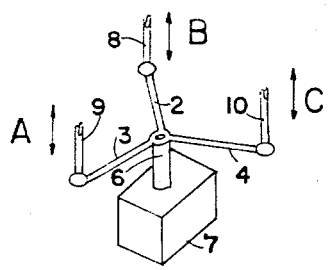
FIG.1.
INVENTORS
PAUL F. HAYNER
LAWRENCE W. SHARPE
ATTORNEY

BY

ATTORNEY

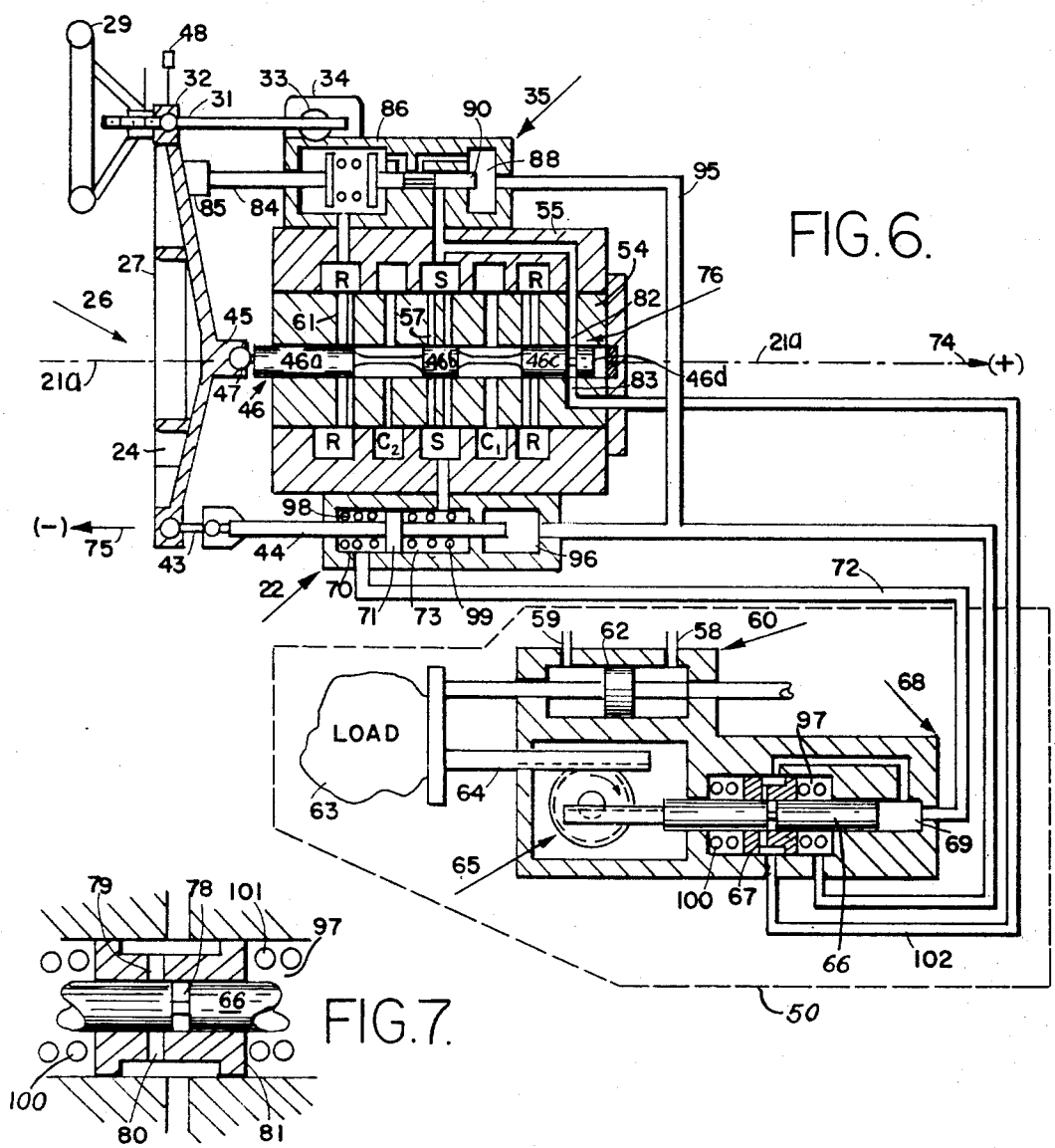
FIG. 6.
FIG. 7.
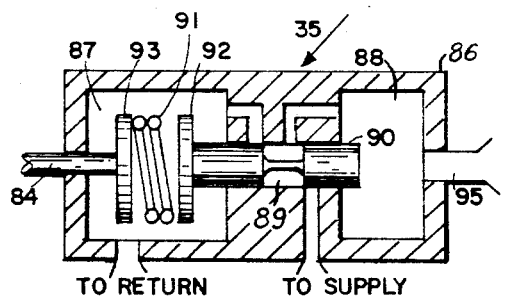
FIG. 8.
INVENTORS
PAUL F. HAYNER
LAWRENCE W. SHARPE
ATTORNEY

United States Patent Office 3,433,129
Patented Mar. 18, 1969

3,433,129
HYDRO-MECHANICAL POSITIONING SYSTEM
Paul F. Hayner, Lexington, Mass., and Lawrence W. Sharpe, Glencliff, N.H., assignors to Sanders Associates, Inc., Nashua, N.H., a corporation of Delaware
Filed Oct. 19, 1966, Ser. No. 587,893
U.S. Cl. 91—384
Int. Cl. F15b 9/10, 13/14, 13/16
9 Claims

ABSTRACT OF THE DISCLOSURE

A hydro-mechanical load positioning system in which a multi-armed mechanical summing mechanism adds vectorially several mechanical inputs such as one representing a preprogrammed pattern of desired load position, another a manual input and a third negative feedback input obtained from the load. The sum of the inputs operates a valve which controls the flow of fluid to an actuator which positions the load. Additionally, apparatus is provided which corrects the system for errors which might otherwise accumulate in the feedback loop.

---

This invention relates to lever mechanisms for combining a plurality of mechanical actuations and, more particularly, to such a mechanism for controlling a system having feedback and which responds to two or more input control actuations and the system feedback.

In operating systems which have feedback, the feedback signal or actuation is often applied in combination with an input control actuation to control the system. When the feedback is negative, as in a position control system, the input actuation and the feedback actuation are combined so that the difference in absolute magnitude between these is instrumental in controlling the system. In other words, the feedback opposes the input and the two are combined so that the difference between them is instrumental in controlling the system. Mechanical mechanisms for combining the input and feedback are available in a great variety, and sometimes consist of a lever with a floating fulcrum. One end of the lever is positioned by the input, and the fulcrum is positioned by the feedback, and so a selected point on the lever provides a control actuation of suitable magnitude and direction for controlling the system.

Position control systems such as mentioned above, having feedback of the type described, are often operated manually by a human operator; and in some applications it is advantageous to apply another input to the system which is automatic and operates as a bias on the system, so that this second input is effective to control the system but can be overridden at any time by the human operator. For example, the second input may represent an automatic control signal, such as employed in autopilots, to maintain a certain schedule of operation of the system, but at all times being subject to being overridden by the human operator. This second input is often derived from a parameter of performance of a vehicle which is controlled by the system. More particularly, the system may be a hydraulic position control system for controlling the rudder of a submarine. In this case, the human operator may directly control the rudder at any time or, at his option, may set the system to maintain a certain submarine heading.

It is an object of the present invention to provide a mechanism for combining three or more mechanical actuations to produce a single mechanical actuation representing the combination.

It is another object of the present invention to provide a mechanism for combining two or more input actuations with a feedback actuation from a system to product a single actuation for controlling the system.

It is another object of the present invention to provide a mechanical system for actuating a hydraulic position control system, whereby two or more input actuations are instrumental in controlling the system.

It is a further object to provide such a hydraulic position control system which is controlled by a human operator and also responds to one or more input control parameters from other sources, and is such that the human operator may override the control at his option.

In the various embodiments of the present invention, a multi-arm lever is provided which has a number of arms, preferably emanating from a common hub and spaced from each other by equal angles subtended from the hub. The hub connects to a system or mechanism which may be, for example, the main hydraulic control valve of a hydraulic position control system. The system feedback actuation is applied mechanically to the end of one of the arms, and the other arms are positioned by input control actuations. For example, one arm may be positioned manually by a human operator, and the third arm may be positioned in response to a vehicle parameter such as submarine heading. As a result, the position of the hub represents the sum of the inputs and the feedback, and so the hub position is suitable for controlling the system. In this manner, the multi-arm lever mechanism serves to add the input and feedback actuations and applies the sum to the system.

In an application of the above-described features of the invention, it is preferable that the number of arms be an odd number, that the arms lie all in the same plane and that the arms subtend equal angles from the hub. Furthermore, depending upon the weighting to be given to each of the actuations which are combined by the mechanism, the arms may be of different lengths. It is preferred, however, that the arms all be of the same length, as this greatly simplifies operation and holds to a minimum the effect of one actuation upon another, so that the input actuations and the feedback actuation have substantially independent effects on the system.

One embodiment of the present invention described herein includes a hydraulic position feedback system including a main control valve and a feedback loop for producing the feedback actuation. The feedback has incorporated therein means for eliminating errors in the feedback loop by recalibrating the loop continually during operation of the device. A similar system is described in considerable detail in the copending application entitled "Hydraulic Feedback System" by Paul F. Hayner and Lawrence W. Sharpe, Ser. No. 661,151 filed on even date herewith and assigned to the same assignee as is the present application. Another similar system is described in another copending application also entitled "Hydraulic Feedback System" by Paul F. Hayner and Lawrence W. Sharpe, Ser. No. 587,742, filed on even date herewith and also assigned to the same assignee as is the instant application. This embodiment combines features of the present invention with the systems in the copending applications to provide a self-calibrating hydraulic position feedback system controlled by a human operator and also controlled by an outside parameter, and such that the human operator can override the parameter control at any time.

Other features and objects of the present invention will be apparent from the following specific description, taken in conjunction with the figures, in which:

FIG. 1 is an isometric view of a simple application of the present invention providing a three-arm (tripod) summing mechanism for delivering a single summation control action to a system;

FIG. 1a is a side view of the three-arm summing mechanism shown in FIG. 1;

FIG. 2 is a simple sketch of the three-arm summing mechanism for summing mechanical actuations applied to each of the arms thereof so that the hub is positioned to represent the sum;

FIG. 6 is a sectional view of the hydraulic position feedback system taken as shown in FIG. 4 and showing, in addition, the system output actuator and system feedback loop;

FIG. 7 is an enlarged view of the output neutral position valve in the system; and FIG. 8 is an enlarged view of the calibration pressure regulator in the system.

Figure 4:
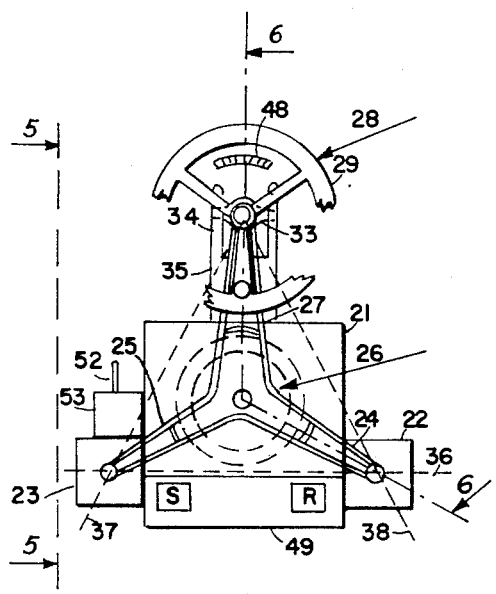
FIGS. 4 and 5 are front and side views of a hydraulic position feedback system responsive to a manual input and an automatic control input and including a feedback loop with means for automatic recalibration during operation of the system.

Turning first to FIG. 1, there is shown a three-arm lever consisting of arms 2, 3 and 4, emanating from a hub 5, and preferably subtending equal angles from the hub. A shaft 6 is pivotally attached at the hub and connects to a controlled system 7 so that the longitudinal movement of the shaft 6 is instrumental in controlling the system 7. In operation, the control actions A, B, and C, each represented by arrows, are administered to the ends of the arms 2 to 4 via rods 8 to 10 pivotally attached thereto, respectively.

The effect of the three control actions is illustrated in FIG. 2, which shows the three-arm mechanism 1 and projections of the mechanism to illustrate the independent effects of each of these control actions. For example, when action A is applied to the end of arm 3, the mechanism 1 will respond by pivoting about a line 11 through the ends of arms 2 and 4, and in so pivoting will move the shaft 6 longitudinally in accordance with the principles of a lever. For example, if the action A causes displacement of the arm 3, denoted $d$, as shown in FIG. 1a, then the displacement of the shaft 6, denoted $ds$, is given by the following relationship:

$$\frac{ds}{d} = \frac{L \sin 30°}{L + L \sin 30°} = \frac{L/2}{3L/2} = \frac{1}{3}$$

thus $ds = d/3$.

Therefore, when the end of the arm 3 is displaced a distance $d$, the shaft 6 will be displaced a distance $d/3$. This is clearly the case when the three arms are of equal length and subtend angles of 120 degrees from the hub. The input actions B and C are analyzed in the same way to pivot the mechanism about lines 12 and 13, and each of these have the same effect on the longitudinal position of the shaft 6. Thus, it is seen that the actuations A, B and C have independent but equal effects on the longitudinal position of the shaft 6 which controls the system 7.

Figure 3:
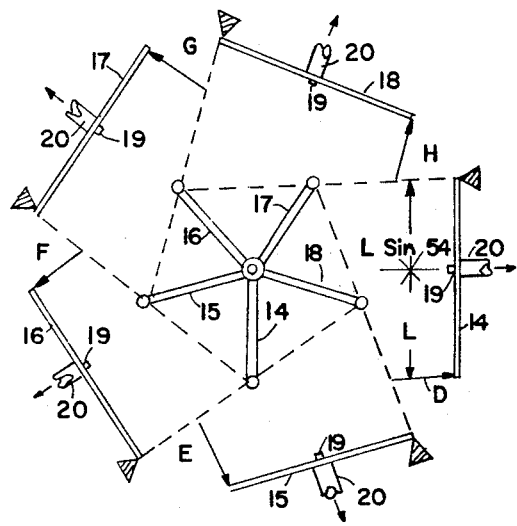
FIG. 3 is a diagram to illustrate an embodiment of the invention employing five arms each responsive to a different control actuation, so that the hub thereof is positioned in accordance with the sum.

The same principles of operation are applicable to the five-arm lever mechanism shown in FIG. 3. Here, five arms 14 to 18 emanate from the hub 19 and are preferably of equal length and subtend equal angles from the hub. Accordingly, the angle between adjacent arms is 72 degrees. The control actions D to H applied to the ends of arms 14 to 18, respectively, are combined by the mechanism; and the sum is manifested in longitudinal movement of the shaft 20 which may connect to a hydraulic position feedback system. If this is the case, then one of the controlled actions D to H is the system feedback, and the other four are input actions, one of which may be a manual input; and the remaining three may be bias or autopilot actuations. In any event, since each of the control actions have substantially independent effects on the shaft 20, the human operator can override the other inputs at will.

Figure 5:
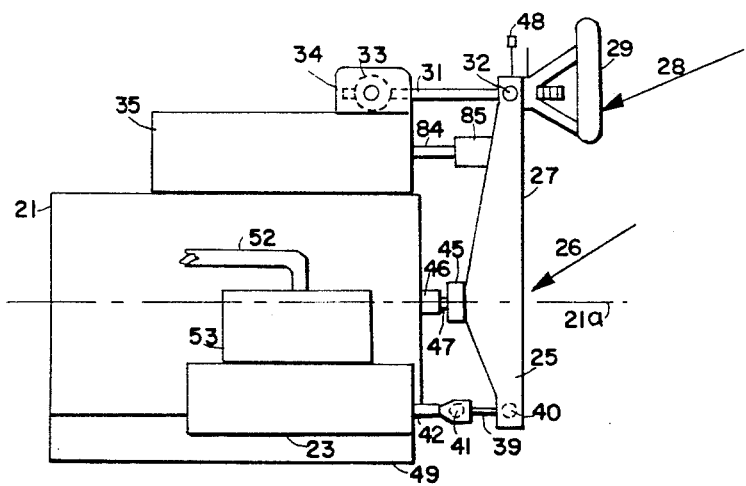

Turning next to FIGS. 4 and 5, there is illustrated a specific application of the three-arm lever mechanism described in FIGS. 1 and 2 to a hydraulic position feedback system of the type described in considerable detail in the above-mentioned copending application Ser. No. 587,742. A portion of the hydraulic position feedback system to which the present invention is applied includes principally the main control valve 21, on one side of which is mounted the feedback actuator 22, and, on the other side, the automatic control actuator 23. These actuators connect to the arms 24 and 25 of the tripod summing mechanism 26. The third arm 27 of the tripod summing mechanism is connected and manipulated by the manual input control 28, which includes a control wheel 29 threaded to a control shaft 31 which is pivotally attached to the end of arm 27 by a ball and socket mechanism 32. The control shaft 31 also connects to an axle 33 carried on a yoke 34. The yoke 34 is located on top of the calibration pressure regulator 35 which is fixed to the top of the valve 21. The connection of the shaft 31 by way of the axle 33 to the yoke permits the shaft to pivot vertically as necessary to permit the end of arm 27 to move toward or away from valve 21 as the tripod summing mechanism 26 pivots about a line 36 defined by the ends of the arms 24 and 25 where these arms attach to the feedback actuator 22 and automatic control actuator 23.

The side view in FIG. 5 shows the connection from the end of arm 25 to the automatic control actuator 23. This connection must accommodate pivoting of the tripod summing mechanism 26 about the line 36 and must also accommodate pivoting the tripod mechanism about the lines 37 and 38, which run from the ends of arms 25 and 27 and arms 27 and 24, respectively. For this purpose, the connector pin 39 includes a ball at each end which connects to matching sockets; one socket 40 is at the end of arm 25, and the other, 41, is at the end of the actuating shaft 42 of the automatic control actuator. A similar connecting pin 43 (shown in FIG. 6) connects the end of arm 24 to the actuating shaft 44 of the feedback actuator 22. Thus, it is seen that the tripod summing mechanism 26 can pivot about the lines 36, 37, and 38, singly or in any simultaneous combination, thereby combining the actuations imparted by the manual control 28, feedback actuator 22, and the automatic control actuator 23. The summing mechanism 26 vectorially adds these actuations so that the center hub 45 of the mechanism translates along the axis 21a of the main control valve 21, and the magnitude of this translational motion is representative of the vector sum of these three actuating motions. This motion of the hub 45 is imparted to the spool 46 of the main control valve. A ball and socket connection 47 is provided for this purpose, and includes, for example, a ball attached to the end of the spool engaging a socket in the hub.

In operation, an operator turns the control wheel 29 one way or the other, noting the position on the scale 48. This causes the end of arm 27 to rotate, and thereby pivot the tripod mechanism about the line 36, and causes the hub 45 to translate along the axis 21a. By virtue of the simple principles of the lever, the magnitude of the translational motion of hub 45 is less than the translation due to rotation of the end of arm 27 imparted by the input mehcanism. For example, if the manual input translates the end of arm 27 a distance $d$, the hub 45 will be translated a distance $d/3$, as was described hereinbefore. This same ratio of motion also holds for the arms 24 and 25, and so the hub 45 translates one-third the total actuating distance applied to the arms by the manual input and the feedback and automatic control actuators. This movement of the hub 45, representing the sum motion, is imparted to the spool 46 of the main hydraulic valve 21 which controls the flow of hydraulic fluid from hydraulic fluid source, S, and return, R, manifolds in the manifold 49 (carried below the valve body) to the output mechanism 50, as shown in FIG. 6.

The output mechanism positions a load and also provides a hydraulic feedback pressure which is fed to the feedback actuator 22 in such a manner that the actuating motion from the actuator which is imparted to the tripod summing mechanism 26 has an opposite effect to that imparted to the mechanism from the manual input 28 or from the automatic control actuator 23. Thus, the feedback is negative feedback. Meanwhile, the automatic control actuator 23 responds to a signal representing an external parameter, which may be applied as a hydraulic signal carried in hydraulic line 52. This signal is fed to a fluid amplifier 53 attached to the automatic control actuator which boosts this signal to the proper level for controlling the actuator. This external hydraulic signal may be preprogrammed bias, or it may represent an autopilot signal responding to a maneuver of a vehicle controlled by the system. Thus, input commands from the manual input 28 and actuator 23 are administered to the tripod summing mechanism which vectorially adds these commands along with the system feedback to control the position of the output mechanism 50. The system can be operated continuously by a human operator whose control actions and manipulations of the wheel 29 override the effects of the autopilot signal, and so, at all times, the system can be controlled by the human operator or left to the control of the autopilot signal.

Operation such as this is most useful in, for example, a submarine where the hydraulic position feedback system is employed to control one of the submarine's external control surfaces by which the submarine dives, maintains depth, heading, or ascends. In this case, the autopilot signal would represent the deviation from the desired performance parameter so that the hydraulic positioning system output, in responding to this autopilot signal, would impart the correct actuation to the external control surface to maintain the desired submarine performance. In this manner, the hydraulic position feedback system operates as a nulling system to maintain the selected submarine performance parameter.

The structural details of the mail hydraulic valve 21, output mechanism 50 which actuates a load and provides the feedback signal, and the calibration pressure regulator 35 are illustrated by the sectional view shown in FIG. 6. This sectional view is taken through the valve and tripod summing mechanism as shown in FIG. 4, and reveals the details of these; and so FIG. 6 reveals one type of system or mechanism (a hydraulic feedback position system) to which the principal features of the present invention are applied. The particular hydraulic system described in FIG. 6 is also described in considerable detail in the above-mentioned copending application Ser. No. 587,742, and includes means for automatically correcting errors which periodically accumulate in the feedback loop of the system in such a way that the loop is recalibrated continuously during operation of the system.

When the tripod summing mechanism is operated as described above, the spool 46 of the main control valve is positioned within the laminar flow sleeve 54 which is fixed in valve housing 55, defining cavities therebetween. The spool 46 includes four sections 46a to 46d. Section 46b meters hydraulic fluid from the supply cavity S by way of laminar flow passages 57 to one or the other of the output cavities $C_1$ or $C_2$ which connect with the lines 58 and 59 feeding hydraulic power actuator 60. The spool sections 46a and 46c meter flow between the output cavities $C_1$ and $C_2$ and the return cavities R by way of laminar flow passages 61. The annular supply and return cavities S and R connect to corresponding manifolds 49 below the main valve (as shown in FIG. 4).

The actuator 60 includes a cylinder and ram or piston 62 which drives the load 63 and the input shaft 64 of the coupling mechanism 65 which positions the positive acting piston 66 and neutral position valve 67 in the floating calibration actuator 68. The piston 66 pressurizes hydraulic fluid in the cavity 69 which connects to one side 70 of the feedback piston 71 in the feedback actuator 22 via line 72. The other side 73 of the feedback piston is fed directly from the hydraulic fluid supply cavity S.

In operation, when the tripod summing mechanism 26 responds to an input applied either by manual control 28 or automatic actuator 23, and moves along the axis 21a in the positive direction, indicated by arrow 74, the spool section 46b opens line 59 to fluid supply pressure S. At the same time, section 46c opens line 58 to the return R. This causes the output ram 62 to move in its positive direction (to the right) and thus moves the piston 66, by way of coupling 65, to the left so as to decrease the pressure in cavity 69, in line 72 and on side 70 of the feedback piston 71, which then moves in the negative direction indicated by arrow 75 and displaces the hub 45 in the negative direction. This shift of the hub 45 in the negative direction, indicated by arrow 75, effectively negates the input action on the spool 46 when the output and input are at corresponding positions, so that the flow of hydraulic fluid between the output actuator 60 and the supply and return cavities S and R is stopped. This locks the output ram 62 in position. Thus, it is seen that the hydro-mechanical position feedback is negative feedback and causes the load position to follow the input.

Recalibration of the feedback system to correct accumulated error is accomplished by connecting the cavity 69, which controls the position of the feedback piston, to supply pressure. The cavity 69 is connected to supply pressure when the input and output neutral position valves 76 and 67 open. The valve 67 opens when the annular groove 78 in the feedback pressure piston 66 is in registry with both of the ports 79 and 80 in the floating calibration sleeve 81. These ports connect the cavity 69 to supply pressure via the input neutral position valve 76. The input neutral position valve 76 is formed between spool sections 46c and 46d by an annular groove between these sections which provides passage between the ports 82 and 83 when the spool 46 blocks flow to and from the load actuator 60.

The calibration pressure regulator 35 is actuated by shaft 84 which pivotally connects to the same arm 27 of the tripod summing mechanism 26 that is engaged by the manual control 28. The connection 85 is preferably near or at the end of the arm 27 where the arm engages the wheel 29. This regulator consists of a housing 86 containing a return chamber 87 and a regulating pressure chamber 88 connected by a cylinder 89 which is loaded with the calibration pressure piston 90. The piston 90 is loaded by a spring 91 which bears against a plate 92 at the end of the piston which projects into the return cavity 87, and this spring is, in turn, loaded by the plate 93 in the return cavity on the end of the control shaft 84. Thus, when the manual input moves in the positive direction, the load on the spring 91 increases, and piston 90 increases the pressure in the calibration pressure cavity 88, and so the pressure in the cavity 88 varies proportional to the position of the manual input 28.

An enlarged view of the calibration pressure regulator 35 is shown in FIG. 8.

The cavity 88 feeds hydraulic fluid calibration pressure via line 95 to the feedback actuator calibration drive chamber 96 at one end of the feedback actuator 22, and also to the valve calibration drive chamber 97 in the fluid position actuator 68. This calibration pressure in chamber 96 biases the position of the feedback 71 so that even though the pressure in chambers 70 and 73 of the feedback actuator is the same (supply pressure), the piston 71 will be displaced from its spring centering position established by springs 98 and 99. The displacement of the piston 71 in turn displaces the arm 24, the hub 45 and the spool 46. The latter moves in a direction opposite to that in which it was moved by the initial movement of the manual control 28 but does not move far enough to cut off the flow of fluid to the power actuator 60. Thus, the position of the hub 45 is biased in accordance with the position of the manual input 28 and in opposition thereto. Likewise, the calibration sleeve 81 in the fluid position actuator 68 is compelled by the pressure in the cavity 97 on one side of the sleeve to move from its spring centered position established by the action of the springs 100 and 101 on each side of the sleeve. When the sleeve 81 is positioned in this manner, away from its spring centered position, the position of the output actuator ram 62 at which ports 79 and 80 in the sleeve 81 connect via the annular opening 78 in the piston 66, is changed and depends upon the position of the manual input 28.

An enlarged view of the piston 66, sleeve 81 and ports 79 and 80 leading from the sleeve to the lines 72 and 102 is shown in FIG. 7.

During dynamic operation, when the hub 45 is moving in the positive direction 74, the main spool 46 is positioned so that hydraulic fluid from the supply cavity S is fed to line 59, making the output actuator ram 62 move the load 63 to the right. When this occurs, the feedback pressure fed from cavity 69 to cavity 70 in the feedback actuator 22 decreases, causing the feedback piston 71 to move the arm 24 in the negative direction 75; and so the main spool 46 is moved in the negative direction (to the left), in opposition to the motion (to the right) caused by the manual input 28. When the output ram 62 reaches a position which corresponds to the position of the manual input 28, dynamic operation ceases; and the spool 46 blocks flow between the lines 58 and 59 which feed the output actuator from the supply and return cavities, S and R, in the main control valve. When this occurs, the input neutral position valve 76 is open so that supply pressure is fed to line 102. Meanwhile, the calibration pressure in line 95 will have positioned the floating calibration sleeve 81 in the actuator 68 so that ports 79 and 80 in the sleeve are open to each other when the output ram 62 reaches a position corresponding to the manual input 28. This completes the path connecting lines 102 to line 72 so that cavity 69, line 72, and cavity 70 are all open to supply pressure. Thus, the pressure differential across the feedback actuator 22 is zero, and a new but displaced neutral or zero position is established for the output actuator 60 by the calibration pressure in line 95; and feedback continues to be equal and opposite to the input. As a result, the system is static each time the output corresponds to the input; and while static, recalibration occurs.

The hydraulic position feedback system described above in FIGS. 6 and 7 includes two neutral position valves 76 and 67, the latter being subject to calibration pressure as well as the output position of the ram 62. When two such valves are employed as described, recalibration occurs when the system is static. The two valves are preferred to insure stable operation, particularly in high gain systems. If system gain is relatively low, and the system is unlikely to encounter operating conditions which produce unstable operation, then the input neutral position valve 76 may be eliminated; and supply pressure may be provided directly to the line 102 which feeds the output neutral position valve 67.

This completes description of general and specific embodiments of the present invention for a mechanism which sums a multitude of mechanical actuations to produce a single actuation representative of the sum thereof. The embodiments of the invention described commonly include a lever mechanism comprised of a multitude of arms attached at a hub and preferably all of the same length and subtending equal angles from the hub. The mechanical actuations are administered to the ends of each of these arms, preferably in parallel directions, so that the position of a shaft connected to the hub is proportional to the summation of these mechanical actuations. In a specific embodiment of the invention, a mechanism of this description includes three arms employed to control the main valve of a hydraulic position feedback system. One of the arms responds to feedback, another to a manual input, and a third to a programmed input such that the manual input can override the others at the option of an operator. The details of structure described herein are made by way of example and are not intended to limit the spirit and scope of the invention as set forth in the following claims.

What is claimed is:

1. A positioning system for controlling, from a first location, the position of a movable load disposed at a second location, comprising, a hydraulic power actuator at said second location mechanically connected to said load, a source of fluid under pressure, at said first location, a mechanically actuated valve means at said first location for controlling the flow of fluid from said source, hydraulic lines interconnecting said valve means and said hydraulic power actuator, whereby mechanical displacement of said valve means from a neutral position causes said load actuator to move said load, a positive acting piston at said second location mechanically connected to said load for movement thereby in direct proportion to the movement of said load and operative upon such movement to vary the pressure in a cavity associated therewith, a feedback actuator at said first location movable in response to pressure variations applied thereto, a hydraulic line interconnecting said cavity and said feedback actuator, whereby said feedback actuator is moved a distance proportional to the distance said load is moved, an input control member at said first location, a summing mechanism at said first location comprising a body having an odd multiple of application points to which mechanical actuations are applied causing said body to move, means for coupling said valve means to a point on said body selected so that the motion of said point on said body in response to motions administered to said body by said mechanical actuations applied thereto is representative of the sum of said mechanical actuations, means for coupling said input control member to one of said application points on said body, and means for coupling said feedback actuator to another of said application points on said body, whereby movement of said input member causes said load to be moved a distance proportional to the distance said input member is moved.

2. A positioning system as in claim 1 and in which, said multiple of points to which mechanical actuations are applied all lie on a common circle and said selected point the motion of which is representative of the sum of said applied mechanical actuations lies at the center of said circle.

3. A positioning system as in claim 2 and in which, said points on said circle are equally spaced thereon.

4. A positioning system as in claim 3 and in which, said mechanical actuating motions applied to said points are applied in parallel directions and
the direction of motion of said selected point is parallel thereto.

5. A positioning system as in claim 4 and in which, said body includes an odd multiple of arms of equal length connected to a common hub and subtending equal angles therefrom,
said different mechanical actuations are applied to the ends of said arms and
said mechanically actuated valve means connects to said hub,
whereby said hub delivers said sum mechanical motion to said actuated valve means.

6. A positioning system as in claim 5 including, three arms defining three actuation points on said circle.

7. A positioning system in claim 1 and in which, another of said applied mechanical actuations represents a bias control to said system.

8. A positioning system as in claim 7 and in which, said input control member, said bias control and said feedback actuations are applied to said arms.

9. A positioning system as in claim 8 and in which, said input control member is manually controlled, whereby said manual control overrides said bias control.

References Cited

UNITED STATES PATENTS

| | | | |
|---|---|---|---|
| 1,199,036 | 9/1916 | Hodgkinson | 91—384 |
| 3,190,185 | 6/1965 | Rasmussen. | |

FOREIGN PATENTS 512,020  6/1932  Belgium.

PAUL E. MASLOUSKY, *Primary Examiner.*

U.S. Cl. X.R.

91—367, 388, 422